United States Patent [19]

Fujishima et al.

[11] Patent Number: 4,687,906

[45] Date of Patent: Aug. 18, 1987

[54] PORTABLE ELECTRIC HAIR DRYER WITH ELECTRIC SHOCK PROTECTION CIRCUIT

[75] Inventors: Nobuichi Fujishima, Hikone; Hideharu Nakano, Ohmihachiman; Shuhei Ochi, Hikone, all of Japan

[73] Assignee: Matsushita Electric Works, Ltd., Osaka, Japan

[21] Appl. No.: 670,359

[22] Filed: Nov. 9, 1984

[30] Foreign Application Priority Data

Nov. 15, 1983 [JP] Japan .................. 58-215310

[51] Int. Cl.$^4$ .................. H05B 1/02; H02H 3/16; A45D 20/00

[52] U.S. Cl. .................. 219/364; 34/97; 219/370; 219/379; 219/509; 219/519; 361/1; 361/42; 361/178

[58] Field of Search .................. 219/369, 370, 364, 363; 361/45, 42, 49, 50, 1; 34/96–101, 243 R, 370, 379, 380, 509, 519

[56] References Cited

U.S. PATENT DOCUMENTS

| | | |
|---|---|---|
| 3,047,775 | 7/1962 | Leriche .................. 361/49 |
| 3,654,515 | 4/1972 | Kato et al. .................. 361/45 |
| 3,708,721 | 1/1973 | Marcade et al. .................. 361/50 |
| 3,728,581 | 4/1973 | Adamo .................. 361/50 |
| 3,761,774 | 9/1973 | Laughinghouse et al. .................. 219/363 |
| 4,001,648 | 1/1977 | Taketa et al. .................. 361/45 |
| 4,002,951 | 1/1977 | Halbeck .................. 361/45 |
| 4,020,394 | 4/1977 | Potash .................. 361/45 |
| 4,270,158 | 5/1981 | Gilardoni et al. .................. 361/42 |
| 4,285,022 | 8/1981 | Lewiner et al. .................. 361/45 |
| 4,464,582 | 8/1984 | Aragaki et al. .................. 219/363 X |
| 4,493,975 | 1/1985 | Yamamoto .................. 219/370 |
| 4,550,358 | 10/1985 | Crowley et al. .................. 361/1 |

FOREIGN PATENT DOCUMENTS

| | | |
|---|---|---|
| 60790 | 9/1982 | European Pat. Off. .................. 361/45 |
| 970295 | 9/1964 | United Kingdom .................. 361/50 |

*Primary Examiner*—Anthony Bartis
*Attorney, Agent, or Firm*—Koda and Androlia

[57] ABSTRACT

A portable electric hair dryer includes an electric heater and blower forming a load circuit energized from a pair of power feeder lines connected to a source of AC power. A zero phase-sequence current transformer is electrically coupled to the power feed lines between the connection thereof to the power source and the load circuit to serve as a current leakage detector. An electricaly conductive heater enclosure disposed within the housing of the hair dryer receives the heater and is electrically isolated from the power feed line serving as the hot line. The heater enclosure is electrically connected to the power feeder line serving as the neutral line by a ground wire extending between the heater enclosure and the point at which the zero phase-sequencing transformer is coupled to the power feeder lines to define a leakage current path between the hot line and the heater enclosure should the hair dryer be dropped in water. Upon detection of leakage current the detector operates a manually resettable switch associated with the power feeder lines to disconnect the load circuit from the AC power source, thus eliminating the danger of electrical shock and ensuring safe retrieval of the hair dryer from the water. The leakage detector and switch may be incorporated into a plug provided on the connecting end of the power feeder lines or they may be incorporated into a wall mounted holder for the hair dryer.

5 Claims, 5 Drawing Figures

PORTABLE ELECTRIC HAIR DRYER WITH ELECTRIC SHOCK PROTECTION CIRCUIT

BACKGROUND OF THE INVENTION

1. Field of the Invention

The present invention relates to a hair dressing implement and more particularly to an electrically operated portable hair dressing implement.

2. Prior Art

Electrical portable hair dressing implements such as hair dryers, hair curling irons, or the like, are usually used in front of the washing stand or cabinet installed in a lavatory or a similar washing room while plugged into the power outlet. In some cases, a washing cabinet is installed close to a sink or bathtub such as in a combination bath and toilet.

Under these water existing circumstances, it is likely that a user of an electrically operated hair dressing implement inadvertently drop the implement into the water during hair dressing. When this should occur, the user may quickly without thinking anything pick up the implement out of the water. This is very dangerous because the water may contain a leakage current which flows continuously from the implement dipped or soaked in the water, and the user touching the water can certainly suffer electric shock. In fact, even in the presence of the leakage current of as little as 50 mA, the user may be shocked to death.

However, existing electric hair dressing implements have no means to prevent such an accidental electrical shock and have been the cause of a possible safety hazard when use around water.

SUMMARY OF THE INVENTION

The above potential hazard is eliminated by the present invention.

The hair dressing implement of this invention includes a leakage current detector detecting a leakage current which flows from a load circuit of the implement. The load circuit is connected to the source of AC power supply by a pair of power feeder lines having a connecting end to be connected to the AC power source.

An electric switch is provide between the connecting end and the load circuit and is operatively connected to the leakage detector in such a manner that the switch normally closes the load circuit and opens it when a leakage current from the load circuit is detected by the leakage detector.

With this arrangement, if a user, during the hair dressing in a lavatory or the similar washing room installed with a water basin such as a washing bowl, bathtub, etc., should accidentally drop the hair dressing implement in the water, a leakage current immediately starts to flow from the load circuit through the water. The above combination of the leakage detector and the electric switch acts to interrupt the electric current flowing from the AC power source to the load circuit. Thus, the leakage current is shut off, and the user can safely pick up the hair dressing implement from the water without any electric shock which is very dangerous.

Accordingly, it is a primary object of the present invention to provide an electrically operated portable hair dressing implement which provides a safeguard against the electric shock when a user retrieves the implement from the water.

The electric switch is a resettable switch with a manually operable reset knob and can be restored to a closed position to connect the load circuit to the source of AC power supply by the operation of the reset knob. Thus, after completely drying the implement which was once immersed in the water, the user can immediately reset the implement into its operating state by simply manipulating the reset knob.

In accordance with a first preferred embodiment, the hair dressing implement includes a housing accommodating therein electric components or loads forming a load circuit, a power cord forming the power feeder lines, and a plug which is a connecting end of the feeder lines to be plugged into an AC power source. The leakage detector and the electric switch are mounted in the plug so as to be remote from the housing which is subject to being accidentally dropped into the water, providing a stable and reliable shutting off operation of the leakage current from the load circuit when it is immersed in the water.

It is, therefore, a further object of the present invention to provide an electrically operated portable hair dressing implement having an advantageous construction of properly preventing the water from entering the load circuit when it is immersed in the water.

In the present invention, a zero phase-sequence current transformer is utilized as the leakage detector which is electrically coupled to the power feeder lines between the load circuit and the connecting end which is the plug.

Included in the housing is an electrically conductive but uncharged member which is electrically connected by a grounding wire to one of the power feeder lines serving as a neutral line. The electrically conductive but uncharged member mentioned above is cooperative with an adjacent load connected to the other feeder line serving as a hot line to define a leakage path extending through the medium of water when the housing is immersed in the water. Specifically, when the housing is immersed in the water, the leakage current flows to that member through the water from the adjacent load. The currents flowing through the respective power feeder lines become unbalanced, and the zero phase-sequence current transformer detects the occurrence of the leakage current.

With the provision of the above grounding wire connecting the electrically conductive but uncharged member to the neutral line, an initial leakage current which triggers the switch to open the load circuit can successfully flow through the water even if the housing is dropped into water or a container which has not been grounded to earth, thus enhancing the safety of the implement in the vicinity of the ungrounded water.

In fact, a lavatory or the similar washing room in which an electric hair dressing implement is used sometimes has water basins or containers which are not grounded. Consequently, it can happen that the user drops the implement into such ungrounded water during hair dressing. In this case, there is always a danger of accidental electric shock in the absence of the above electrical connection between the neutral line and the electrically conductive but uncharged member.

It is, therefore, a still further object of the present invention to provide an electrically operated portable hair dressing implement equipped with a current interrupting function effective for ungrounded water as well as for the grounded water.

In the preferred embodiment in which the hair dressing implement is a hair dryer, the above member to be connected to the neutral line is defined by a heater enclosure made of electrically conductive material and is disposed closer to a heater forming the load circuit so as to define therewith the leakage path. The heater enclosure has an enlarged, exposed surface by which the initial leakage current can flow immediately after the heater and the heater enclosure are dropped into the water so as to interrupt the load circuit immediately, increasing the sensitivity against leakage by better utilization of the heater enclosure. This is a still further object of the present invention. Also, for ensuring correct connection between the electrically conductive but uncharged member and the neutral line, the plug is designed to avoid a reverse connection to the AC outlet.

The present invention discloses still other useful features including a wall mounting holder. The wall mounting holder, installed on a wall, detachably holds the housing of a hair dressing implement and is provided therein with a leakage detector and an associated electric switch.

BRIEF DESCRIPTION OF THE DRAWING

The advantageous features mentioned above and other features of this invention will be more apparent from the following detailed description of the preferred embodiments when taken in conjunction with the accompanying drawing, in which.

DETAILED DESCRIPTION OF THE INVENTION

Figure 1:
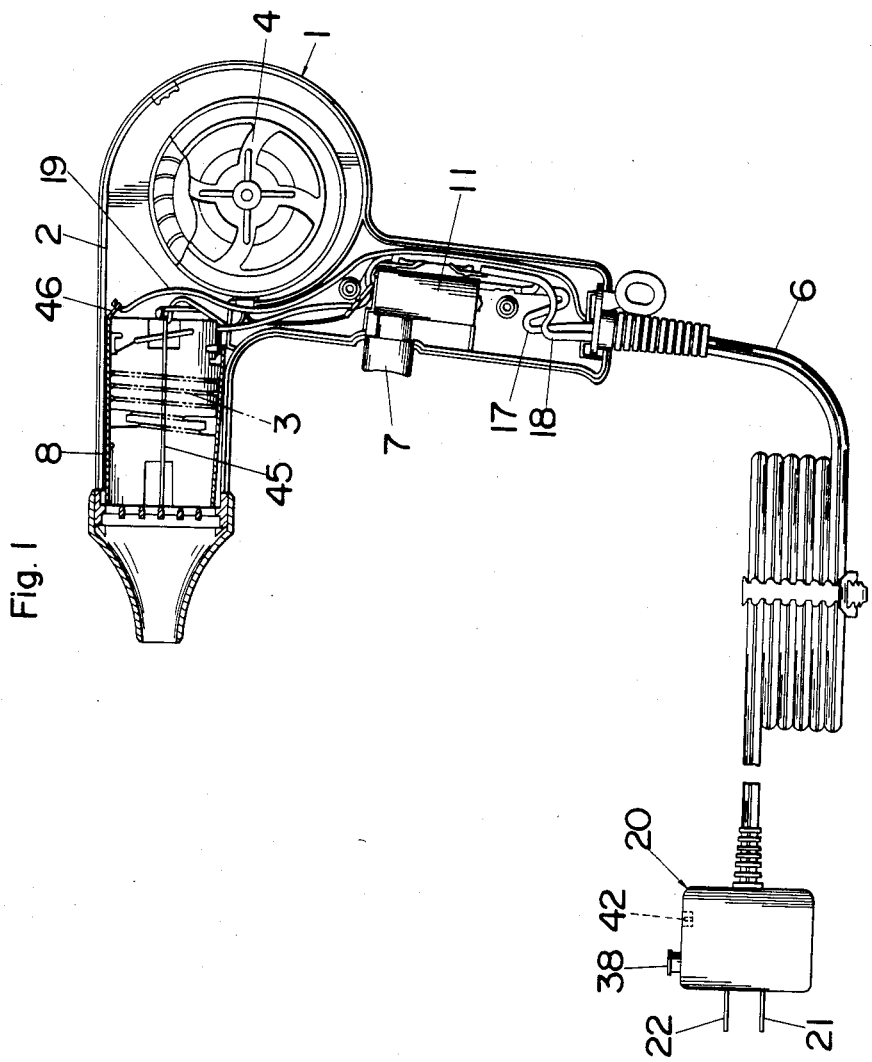
FIG. 1 is a longitudinal section, partly in front elevation, of a hair dryer in accordance with a first embodiment of the present invention.
Figure 2:
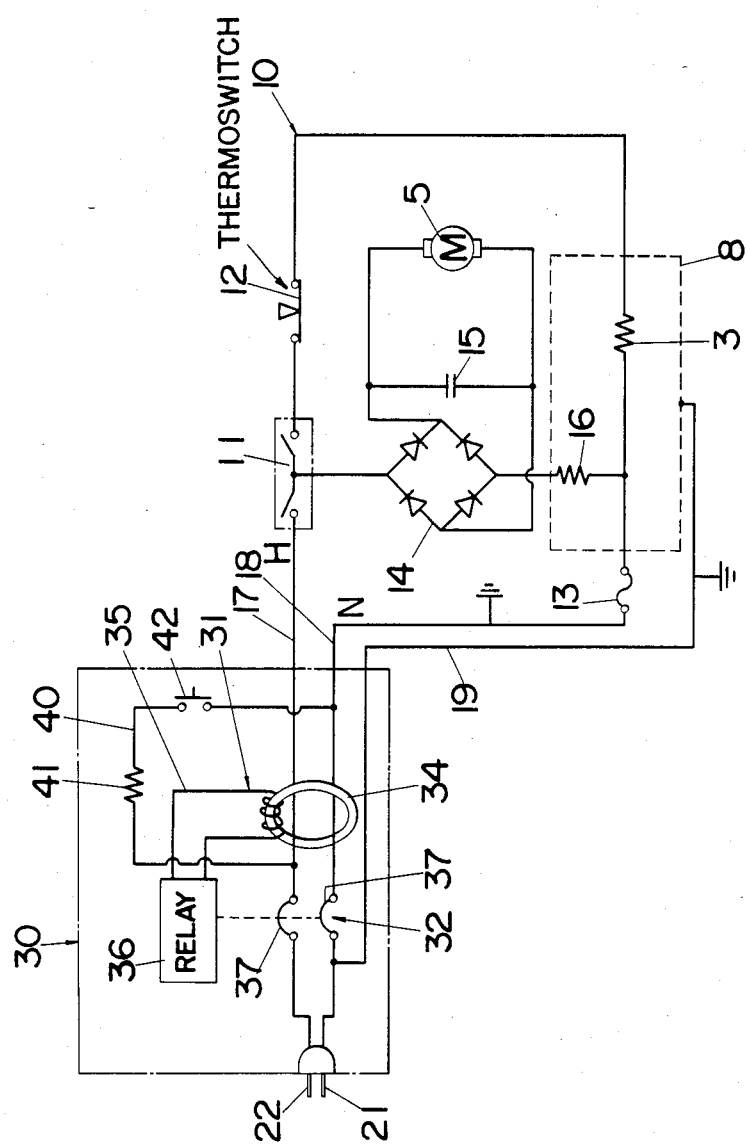
FIG. 2 is a circuit diagram of the above hair dryer.

Referring now to FIGS. 1 and 2, shown therein is a portable hair dryer 1 in accordance with a first embodiment of the present invention.

The hair dryer 1 includes a housing 2 made of electrically insulative plastic material to accommodate a heater 3, a blower fan 4, and an electric motor 5 for driving the fan 4, which are electrically interconnected to form a load circuit 10.

The load circuit 10 is energized by an AC power supply through a power cord 6. One end of the cord 6 is connected to a plug 20, and the other end is connected to the load circuit 10 within the housing 2. The load circuit 10 includes, as shown in FIG. 2, a power switch 11, a thermo-switch 12 for preventing over heating, a fuse 13, a diode bridge 14, a smoothing capacitor 15, and a dividing resistor 16.

The power switch 11 is actuated by a trigger button 7 mounted on the housing 2. The power cord 6 is a three-wire cable including a pair of power feeder lines 17 and 18 and a grounding wire 19. The power feeder line 17 serves as a hot line, and the power feeder line 18 serves as a neutral line. The grounding wire 19 electrically connects a heater enclosure 8, made of electrically conductive material, to the neutral line 18. The purpose of this connection will be described later.

Mounted within the plug 20 is a leakage detector 31. The detector 31 cooperates with an electric switch 32 to define an interrupting means 30 for connecting and disconnecting the load circuit 10 with and from a source of AC power supply. The leakage detector 31 is in the form of a zero phase-sequence current transformer electrically coupled to the power feeder lines 17 and 18 between its connecting ends, that is, the plug 20 and the load circuit 10, for detecting any leakage from the load circuit 10. The zero phase-sequence current transformer includes a toroidal core 34 on which is wound a secondary winding 35 and through which the power feeder lines 17 and 18 extend as a primary winding. The secondary winding 35 provides an output voltage when unbalanced currents flow through the feeder lines 17 and 18. The flow of the unbalanced currents is indicative of a leakage current flowing from the load circuit 10 to the earth.

Figure 3:
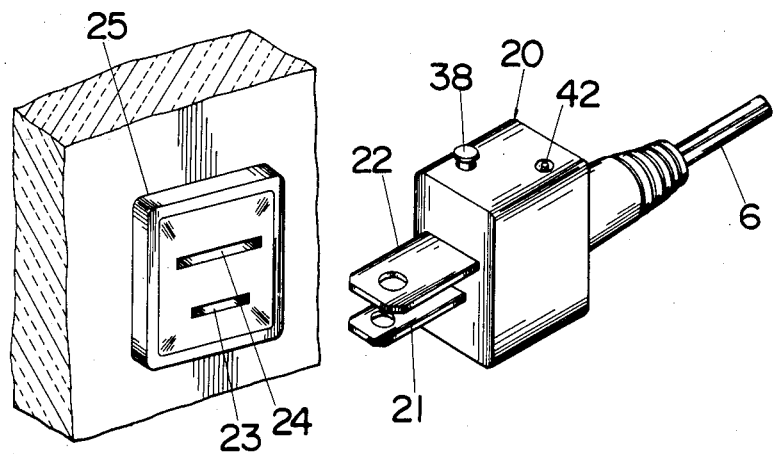
FIG. 3 is an enlarged perspective view of a plug of the hair dryer and an AC outlet into which the plug is inserted.

Connected to the secondary winging 35 is a resettable relay 36 provided with double-throw contacts 37 disposed respectively on the feeder lines 17 and 18 to form an electric switch 32 for opening the load circuit 10 only when the zero phase-sequence current transformer detects the leakage current or the secondary winding 35 provides an output voltage. The relay 36, mounted also in the plug 20 together with the leakage detector 31, is provide with a manually operable reset knob 38 which is in the form of an outwardly urged push-button on the plug 20, as shown in FIG. 3. Thus, the switch 32 can be restored to a closed position which connects the load circuit 10 to the power source by simply operating the push-button 38.

Also included in the interrupting means 30 is a test circuit 40 which is connected between the power feeder lines 17 and 18 cross the toroidal core 34 of the zero phase-sequence current transformer so as to short-circuit the feeder lines 17 and 18 for the purpose of testing. To this end, the test circuit 40 includes a series combination of a by-pass resistor 41 and a momentary action test switch 42 which is accessible from the outside of the plug 20.

As shown in FIG. 3, the plug 20 has a pair of contact blades, a hot blade 21 and a neutral blade 22, which are respectively connected to the hot and neutral lines 17 and 18 and are arranged to be inserted in a hot slot 23 and a neutral slot 24 formed in an AC outlet 25 to be connected with the source of AC power supply.

In view of the fact that the existing outlet is designed such that the neutral slot 24 is wider than the hot slot 23, the neutral blade 22 is formed wider than the hot blade 21 for insuring a position-correct connection between the outlet 25 and the plug 20. Specifically, the hot and neutral blades 21 and 22 are designed to produce a tight fit to the corresponding slots 23 and 24 for preventing a reversed connection. This is important in the present embodiment since the neutral line 18 must be connected to the neutral side of the AC power supply in order to properly operate the interrupting means 30.

Figure 4:
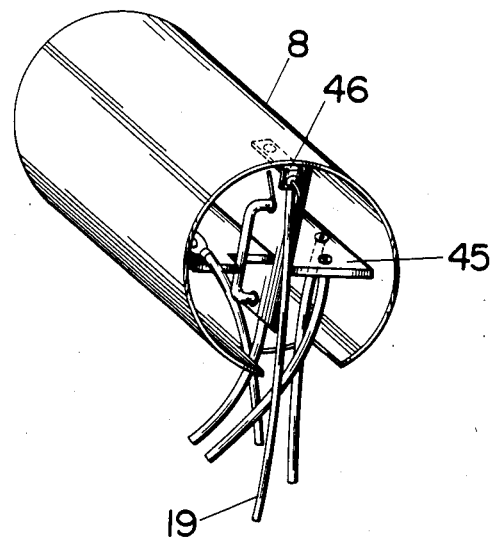
FIG. 4 is a perspective view of a heater enclosure employed in the above hair dryer.

The heater enclosure 8 connected to the neutral line 18 by means of the grounding wire 19 is shaped into a cylindrical configuration which provides an enlarged exposed surface, as best shown in FIG. 4. The heater 3 disposed within the enclosure 8 is a coil which is wound around and supported by a carrier 45, made of electrically insulative material, and is spaced closer to the enclosure 8 to leave therebetween a small insulation gap. Fixed at one end of the enclosure 8 is a connection tab 46, and the grounding wire 19 is connected to the tab 46 by, for example, staking, spot welding, etc. Thus, the grounding wire 19 is easily connected to the enclosure 8.

Defined between the heater 3 and the enclosure 8 is a leakage path for the flow of leakage current through the medium of water when the housing 2 of the dryer 1 is immersed in the water. In this sense, the enlarged surface of the heater enclosure 8 is cooperative with the heater 3, also having an enlarged exposed surface, to be an effective water detecting means which might be in contact with water with greater chances than any other of the electric components in the housing 2 and therefore has an increased sensitivity for detecting the water.

In operation, if the dryer 1 is accidentally dropped into the water during the hair dressing operation, the water enters into the space between the enclosure 8 and the heater 3. At this moment, the leakage path is established and a leakage current flows through the medium of water from the heater 3 of the load circuit 10 to the enclosure 8, short-circuiting the feeder lines 17 and 18 to immediately cause the electric switch 32 to open through the operation of the leakage detector 31 and the relay 36 so that no further current flows to the load circuit 10. After this shutting off of the load circuit 10, the water becomes completely free from the electric charge, and therefore, the user can safely touch the housing 2 and pick up the dryer 1 from the water without any danger of electric shock.

It should be noted that the above arrangement connecting the heater enclosure 8 to the neutral line 18 can detect any leakage in the water without fail even if the water or the container thereof is not grounded. It goes without saying that the above interrupting means 30 can properly operate if the housing 2 should fall into grounded water. In this case, a leakage current may flow from the load circuit 10 toward the grounded end of the water.

Figure 5:
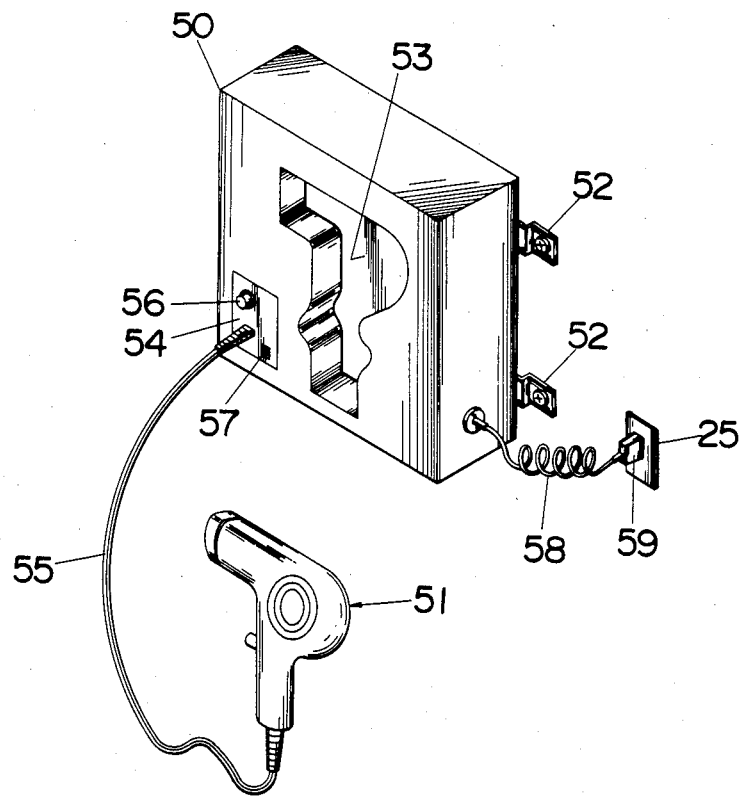
FIG. 5 is a schematic perspective view of a hair dryer in accordance with a second embodiment of the present invention.

Referring to FIG. 5, a second embodiment of the present invention includes a combination hair dryer 51 and a wall mounting holder 50.

The housing of a dryer 51 is provided with the same electric components including the heater and the heater enclosure which form the load circuit as in the first embodiment. The wall mounting holder 50, secured with brackets 52 for fixing the holder on a wall of a lavatory, etc., is formed with a recess 53 so that the the dryer 51 is detachably held in the recess 53.

Also formed in the holder 50 is a section 54 for accommodating an interrupting means of the same circuit arrangement as in the first embodiment which is connected to the load circuit in the dryer housing by means of a power cord 55. A manually operable reset button 56 for a resettable relay in the interrupting means and a test switch 57 for a testing circuit in the interrupting means are both accessible from the front of the wall mounting holder 50.

The operations of the reset button 56 and the test switch 57 are identical with those of the first embodiment. An extension power cord 58, extending from the wall mounting holder 50, is provided with a plug 59 and is connected through the plug 59 to the AC outlet 25 for supplying an operating current to the load circuit through the interrupting means.

We claim:

1. An electrically operated portable hair dryer comprising:
an electric heater and a blower;
a pair of power feeder lines having a connecting end to be electrically connected to a source of AC power for energizing a load circuit including said heater and blower connected to the other end of the power feeder lines;
a leakage detector electrically coupled to the power feeder lines for detecting leakage current from the load circuit, said leakage detector being a zero phase-sequence current transformer electrically coupled to the power feed lines between the connecting end and the load circuit;
an electric switch disposed between said connected end and the load circuit for connecting the load circuit to the source of AC power and disconnecting it therefrom, said electric switch including means operatively connected to the leakage detector for opening said switch upon detection of the leakage current by said leakage detector; and
a heater enclosure disposed within a housing of the hair dryer for receiving therein said heater, said heater enclosure being made of an electrically conductive material and being electrically isolated from the heating element and the one of said power feeder lines serving as a hot line so as to be electrically uncharged, and the heater enclosure being grounded by means of a grounding line electrically connected thereto so as to define with said one of said power feeder lines serving as the hot line a leakage current path extending therebetween through the medium of the water when it is immersed in the water, said grounding line connecting said heater enclosure to the other power feeder line serving as the neutral line at a point between said connecting end and the coupling portion of said power feeder lines with said zero phase-sequence transformer, thereby defining a leakage path extending through the medium of the water between the heater enclosure and the hot line of the power feeder lines when the enclosure is immersed in water.

2. The electrically operated portable hair dressing implement as set forth in claim 1, wherein said electrical switch is a resettable switch having a manually operable knob by the operation of which the switch is put into a closed position of connecting the load circuit with the source of AC power supply.

3. The electrically operated portable hair dressing implement as set forth in claim 1, wherein said leakage detector and the electric switch are mounted within a plug to be inserted into an AC electric outlet for connection with the source of AC power supply.

4. The electrically operated portable hair dressing implement as set forth in claim 1, wherein the implement has a plug adapted to be inserted to a conventional AC outlet having a hot slot and a neutral slot for connection with the source of AC power supply, said neutral slot having an opening wider than that of the hot slot, said plug having a hot blade and a neutral blade connected respectively to said hot and neutral blades being dimensioned to snugly fit into the corresponding slots for preventing the reverse connections between said power feeder lines and the slots in the AC outlet.

5. The electrically operated portable hair dryer as set forth in claim 1, further including a wall mounting holder in which a housing of the dryer is detachably received and through which said power feeder lines extend to the source of AC power supply, said wall mounting holder incorporating therein said leakage detector and the electric switch.

* * * * *